United States Patent [19]
Cross

[11] Patent Number: 4,920,656
[45] Date of Patent: May 1, 1990

[54] COMPASS ASSEMBLY WITH DIAL BIASING DISK

[75] Inventor: Gregory L. Cross, Arvada, Colo.

[73] Assignee: Sun Company, Inc., Arvada, Colo.

[21] Appl. No.: 393,521

[22] Filed: Aug. 11, 1989

[51] Int. Cl.⁵ ............................................. G01C 17/04
[52] U.S. Cl. ..................................... 33/355 R; 33/364
[58] Field of Search ..................... 33/355 R, 364, 352, 33/272

[56] References Cited

U.S. PATENT DOCUMENTS 2,336,789 12/1943 Jonsson ................................. 33/364
2,824,382 2/1958 Sandberg ............................. 33/355

FOREIGN PATENT DOCUMENTS 880414 9/1971 Canada ............................. 33/355 R
147880 11/1954 Sweden ................................. 33/272

Primary Examiner—Harry N. Haroian
Attorney, Agent, or Firm—William P. O'Meara; Klaas & Law

[57] ABSTRACT

A compass assembly comprising a base, a dial member received in a recessed portion of the base and rotatable relative the base about a dial member central longitudinal axis, and a compass housing received in a recessed portion of the dial member and fixedly secured to the base by a connecting disk. The disk has a first surface attached to the housing and a second surface attached to the base and a peripheral edge surface positioned in frictionally engaging contact with the dial member. The dial member is biased against rotation relative the base and the compass housing by the disk.

8 Claims, 1 Drawing Sheet

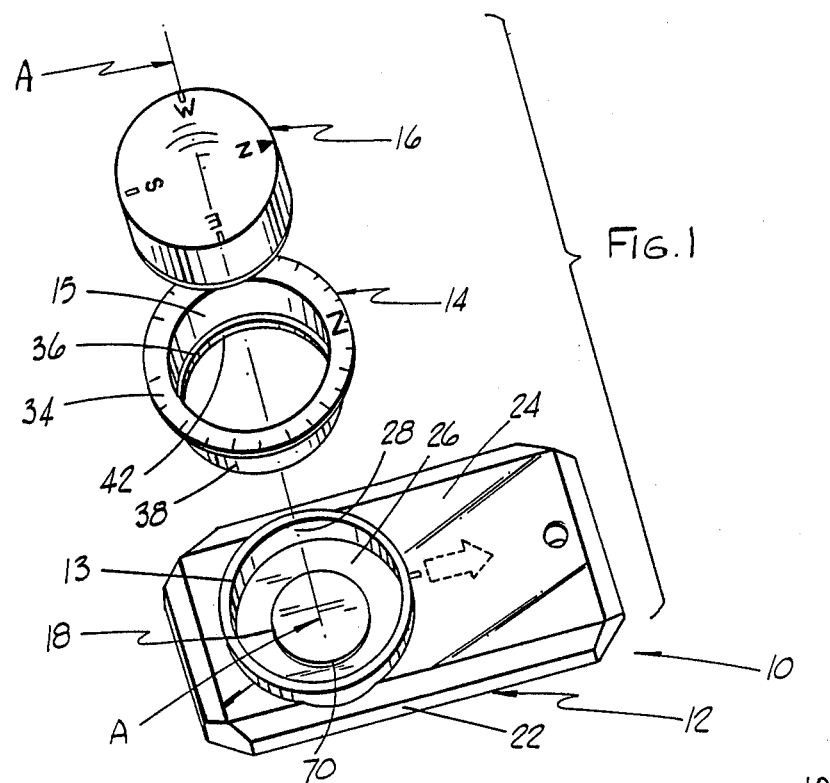
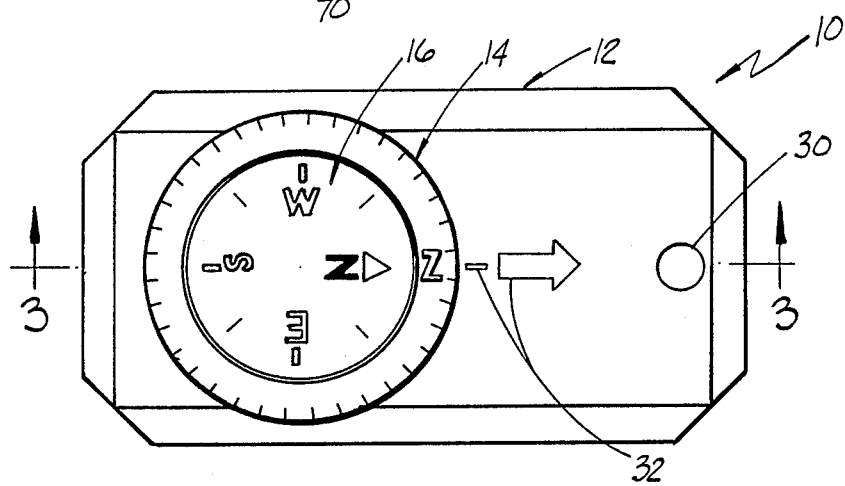
FIG. 2
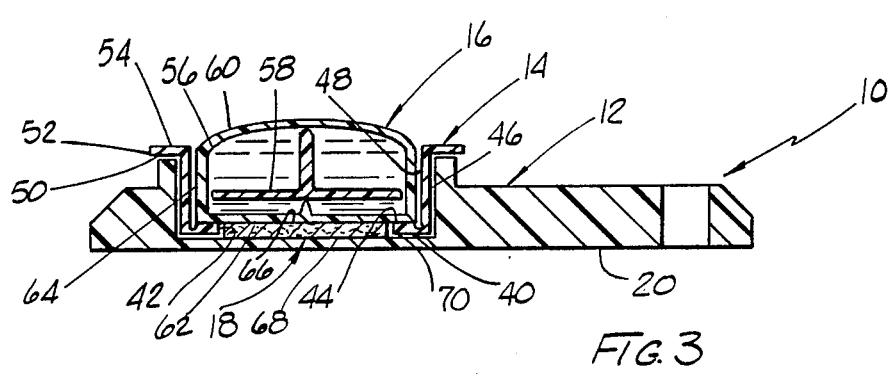
FIG. 3

COMPASS ASSEMBLY WITH DIAL BIASING DISK

BACKGROUND OF THE INVENTION

The present invention relates generally to compass assemblies and, more specifically, to an orienteering compass with a rotating dial.

A conventional orienteering compass assembly may comprise a magnetized compass pointer encased in a housing and suspended as by liquid or a rod, etc. The housing is received in a dial member which is in turn received in a base. The dial member may have printed on a visible surface thereof degree markers corresponding to heading directions, e.g. 0° indicates due North, 180° indicates due South, etc. In use, a degree marker that corresponds to the desired direction of travel is aligned with a mark on the base, this mark on the base including an arrow or other indication of direction. When the "North" indicator on the compass pointer is aligned with the "North" indicator on the dial member, the mark/arrow on the base points to the desired direction of travel.

With such compasses, it is desirable that the dial member be relatively easy to rotate and yet be adapted to retain its position at a selected degree marker. Therefore, a biasing member is included in most such compass assemblies to control the rotation of the dial member. Typical prior art biasing members used for this purpose comprise a spring clip member which is mounted in a sidecut recess in the compass base and which engages a grooved portion of the dial member to provide resistance to turning and to prevent disassembly of the pieces. However, use of such a biasing member usually requires "undercuts" in the plastic parts, which requires expensive molding and tooling.

It would be generally desirable to provide an orienteering compass assembly having a biased dial member which is relatively inexpensive to produce.

SUMMARY OF THE INVENTION

The present invention may comprise a compass assembly comprising: a base member; a dial member received in a recessed portion of said base member and rotatable relative the base member about a dial member central longitudinal axis; a compass housing member received in a recessed portion of said dial member and fixedly secured to said base member by a connection device; a connection device having a first surface attached to said housing member and a second surface attached to said base member and a peripheral edge surface positioned in frictionally engaging contact with said dial member; whereby said dial member is captured between said base member and said compass housing member and whereby said dial member is biased against rotation relative said base member and said compass housing member by said connection device.

The invention may also comprise a compass assembly comprising: a base member having a recess therein defined by a cylindrical sidewall and a circular bottom wall; a dial member having a cylindrical sidewall and a ring-shaped bottom wall defining a dial member recess said ring-shaped bottom wall having a circular hole extending therethrough; said dial member being adapted to be received within said recess in said base member; a compass housing member having a generally cylindrical sidewall and a generally circular bottom wall, said compass housing member being adapted to be received within said dial member recess; a disk member having a diameter approximately equal to the diameter of said circular hole in said ring-shaped bottom wall of said dial member and having a thickness approximately equal to the wall thickness of said ring-shaped bottom wall; said disk member having a circular top surface attached to said circular bottom surface of said compass housing and having a circular bottom surface attached to said circular bottom wall of said base member recess and having a cylindrical edge surface positioned in frictionally engaging contact with an annular surface defining said circular hole in said ring-shaped bottom wall of said dial member; said dial member being rotatably adjustable relative to said base member and said compass housing member, said dial member being biased against rotation through said frictional contact between said disk member and said dial member.

BRIEF DESCRIPTION OF THE DRAWING

An illustrative and presently preferred embodiment of the invention is shown in the accompanying drawings in which:

FIG. 1 is an exploded perspective view of a compass assembly;

FIG. 2 is a top plan view of a compass assembly; and

FIG. 3 is a cross sectional elevation view of a compass assembly.

DETAILED DESCRIPTION OF THE INVENTION

As shown in FIG. 1, the compass assembly 10 of the present invention may comprise a base member 12, a dial member 14 received in a recessed portion 13 of the base member and rotatable relative the base member about a dial member central longitudinal axis AS, and a compass housing member 16 received in a recessed portion 15 of the dial member and fixedly secured to the base member by a connection device 18.

The base member 12 may be generally rectangular in shape and may have a length of, e.g., 2 in.; a width of, e.g., 1.125 in.; and a thickness of, e.g. 0.25 in. The base member 12 has a bottom, generally flat surface 20, FIG. 3; four lateral side surfaces, e.g. 22, which may have beveled edges and corners; and a top surface 24. The top surface 24 has a generally cylindrical recessed portion 13 defined by a circular bottom surface 26 and a cylindrical sidewall surface 28. The recess 13 may have a diameter of, e.g. 0.80 in. and a depth of, e.g. 0.21 in. The recess 13 may be located at one end of the length of the base, e.g. 0.9 in. from one end and 0.3 in. from the other end, and laterally centered in the base. A hole 30, FIG. 2, which may have a diameter of, e.g., 0.15 in., may be located at one end of the base 12 to facilitate attaching the compass assembly to a keyring or the like. A mark 32, FIG. 2, may be printed on the base and may include an indication of direction, such as an arrow, to be used in the operation of the compass as described above in the Background of the Invention. The base member 12 is preferably constructed of a high-strength, transparent plastic.

As shown in FIG. 1, a dial member 14, which is preferably constructed of a high-strength plastic, is received in the recessed portion 13 of the base 12. Dial member 14 is generally cylindrical in shape and may comprise an upper ring-shaped flange portion 34 and a recessed portion 15. Dial member recessed portion 15 is defined by the upper surface of a lower ring-shaped wall portion 36 and the interior surface of an axially extending, cylindrical sidewall 38.

As best shown in FIG. 3, the lower ring-shaped wall portion 36 of dial member 14 may include a lower, radially extending surface 40, which is positioned in touching or near-touching contact with the bottom surface 26 of the base member recess portion 13. Surface 40 may have an inner diameter of, e.g., 0.622 in. and an outer diameter of, e.g. 0.780 in. The inner diameter defines the diameter of the hole created in the bottom of recess 15 by the lower ring-shaped portion 36. The outer diameter of surface 40 is sufficiently close to the diameter of the recessed portion 13 of the base so that the dial member is closely rotatably received in the recess of the base. The lower ring-shaped wall portion 36 also includes an inner, axially extending edge surface 42 which may be, e.g., 0.031 in. Lower wall portion 36 is finally defined by an upper, radially extending surface 44 which is positioned in touching contact with the compass housing member 16 and which may have an inner diameter identical to the inner diameter of surface 40 and an outer diameter of, e.g., 0.723 in. This outer diameter of surface 44 defines the diameter of the recessed portion 15 of the dial member.

The axially extending, cylindrical sidewall 38 of dial member 14 may include an outer peripheral surface 46, which is in touching or near-touching relationship with the sidewall 28 defining recessed portion 13 of base 12. Sidewall 38 further includes an inner peripheral surface 48, which is positioned in touching contact with the compass housing member 16. Outer surface 46 may have a height of, e.g., 0.210 in., which is identical to the depth of the recessed portion 13 of the base 12. Inner surface 48 of sidewall 38 may have a height of, e.g., 0.220 in., this inner dimension defining the depth of dial member recessed portion 15. Sidewall 38 may have a thickness of, e.g., 0.057 in.

The upper ring-shaped flange portion 34 of the dial member may include a lower, radially extending surface 50 which may have an outer diameter of, e.g., 0.950 in. and an inner diameter of, e.g., 0.780 in. Portion 34 may also include an axially extending, peripheral side surface 52 which may have a height of, e.g., 0.041 in. Finally, portion 34 may include an upper, radially extending surface 54 which may have an outer diameter of, e.g., 0.950 in. and an inner diameter of, e.g., 0.723 in. (which is the same as and defines the diameter of the recessed portion 15 of the dial). Upper surface 54 may have printed on its face degree markers corresponding to heading directions as described above in the Background of the Invention.

As shown in FIG. 3, a compass housing member 16 is received in the recessed portion 15 of the dial member 14. Compass housing member 16 may comprise a compass housing 56 encasing a compass pointer 58 suspended in a conventional manner, e.g. as by liquid, etc. The compass housing 56 is generally cylindrical in shape and may include an upper radially extending surface 60 (which may be domed), a lower radially extending surface 62, and a cylindrical sidewall 64. Upper surface 60 and lower surface 62 may each have a diameter, e.g. 0.60 in., which is sufficient to allow the compass housing to be closely received in the dial member recessed portion 15. Cylindrical sidewall 64 may have a height identical to the depth of dial member recessed portion 15.

As shown in FIGS. 1 and 3, the compass assembly 10 of the present invention may include a connection device 18 which may be generally disk-shaped and which may have a first surface 66 adhesively attached to the compass housing lower surface 62, a second surface 68 attached to the circular bottom wall 26 of the base member recess 13, and a peripheral edge surface 70 adapted to be positioned in frictionally engaging contact with the inner, axially extending surface 42 on the lower ring member 36 of the dial member 14. The frictional contact of the connection device 18 with surface 42 of the dial member produces a force on the dial member which resists rotation of the dial member relative the base member 12, i.e. biases the dial member against rotation.

The disk 18 may have a diameter of, e.g., 0.622 in. and a thickness of, e.g., 0.031 in. It is an important feature of the present invention that the diameter of the disk 18 is identical or nearly identical to the diameter of the hole in the bottom of dial member recess 15, i.e. the inner diameter of the lower ring-shaped portion 36 of the dial member. This feature allows the frictional contact between surface 70 of the disk and surface 42 of the dial member. Preferably, the thickness of disk 18 is preferably slightly greater, e.g. 0.005 in. greater, then the height of surface 42.

Disk 18 is preferably constructed of a closed-cell foam material. The peripheral edge surface 70 of the closed-cell foam disk provides a sufficient amount of frictional contact with surface 42, and thus a sufficient amount of biasing force on the dial member, such that the dial member can be easily adjusted when desired but remains "locked" in a selected position due to the frictional biasing force.

Disk 18 first surface 66 and second surface 68 may be attached to the compass housing and the base member, respectively, by an acrylic adhesive coating on surfaces 66 and 68. This adhesive coating is preferably applied such that it "drools" around the peripheral edge surface 70 of the disk and thus aids in the biasing of the dial member by coaction with surfaces 70 and 42. Due to the characteristics of acrylic adhesive, the adhesive "drool" does not form a significant bond until after it has "set up" for a period of time, e.g. 10 to 20 seconds. Thus, the adhesive does not interfere with the turning of the dial until after the dial has been positioned in a stationary location for several seconds, allowing a user to "fine-adjust" his compass selection without interference from the adhesive. The bond which the adhesive "drool" later forms between surfaces 70 and 42 is relatively weak and is easily overcome by an initial twist of the dial when compass readjustment is needed.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A compass assembly comprising:
  (a) a base member;
  (b) a dial member received in a recessed portion of said base member and rotatable relative the base member about a dial member central longitudinal axis;
  (c) a compass housing member received in a recessed portion of said dial member and fixedly secured to said base member by a connection device;

(d) said connection device having a first surface attached to said housing member and a second surface attached to said base member and a peripheral edge surface positioned in frictionally engaging contact with said dial member;

(e) whereby said dial member is captured between said base member and said compass housing member and whereby said dial member is biased against rotation relative said base member and said compass housing member by said connection device.

2. The invention of claim 1 wherein said connection device comprises a closed-cell foam member.

3. The invention of claim 1 further comprising adhesive provided on a peripheral portion of said connection device and adapted to provide a yielding bond between said connection device and said dial member for further biasing said dial member against rotation.

4. The invention of claim 1 wherein said connection member comprises a disk member.

5. The invention of claim 1 wherein said connection device comprises a closed-cell-foam disk member having adhesive applied to a peripheral surface thereof.

6. The invention of claim 1 wherein said connection device comprises a disk member received within an annular surface portion of said dial member.

7. A compass assembly comprising:
(a) a base member having a recess therein defined by a cylindrical sidewall and a circular bottom wall;
(b) a dial member having a cylindrical sidewall and a ring-shaped bottom wall defining a dial member recess; said ring-shaped bottom wall having a circular hole extending therethrough; said dial member being adapted to be received within said recess in said base member;
(c) a compass housing member having a generally cylindrical sidewall and a generally circular bottom wall, said compass housing member being adapted to be received within said dial member recess;
(d) a disk member having a diameter approximately equal to the diameter of said circular hole in said ring-shaped bottom wall of said dial member and having a thickness approximately equal to the wall thickness of said ring-shaped bottom wall; said disk member having a circular top surface attached to said circular bottom surface of said compass housing and having a circular bottom surface attached to said circular bottom wall of said base member recess and having a cylindrical edge surface positioned in frictionally engaging contact with an annular surface defining said circular hole in said ring-shaped bottom wall of said dial member;
(e) said dial member being rotatably adjustable relative to said base member and said compass housing member, said dial member being biased against rotation through said frictional contact between said disk member and said dial member 8. The invention of claim 7 further comprising adhesive material adhered to said edge surface of said disk member and adapted to provide a yielding bond between said disk member and said dial member for further biasing said dial member against rotation.

* * * * *